(12) United States Patent
Kypreos et al.

(10) Patent No.: US 12,389,002 B2
(45) Date of Patent: Aug. 12, 2025

(54) SYSTEMS AND METHODS FOR MULTIPLE CHANNEL VIDEO ENCODING IN A SHARED RESOURCE ENVIRONMENT

(71) Applicant: MK Systems USA Inc., Wilmington, DE (US)

(72) Inventors: Jean Kypreos, Rennes (FR); Michael Ropert, Rennes (FR)

(73) Assignee: MK Systems USA Inc., Wilmington, DE (US)

( * ) Notice: Subject to any disclaimer, the term of this patent is extended or adjusted under 35 U.S.C. 154(b) by 226 days.

(21) Appl. No.: 18/306,772

(22) Filed: Apr. 25, 2023

(65) Prior Publication Data

US 2023/0362380 A1  Nov. 9, 2023

(30) Foreign Application Priority Data

May 4, 2022 (EP) .................................... 22305667

(51) Int. Cl.
*H04N 19/00* (2014.01)
*H04N 19/127* (2014.01)
*H04N 19/14* (2014.01)

(52) U.S. Cl.
CPC .......... *H04N 19/127* (2014.11); *H04N 19/14* (2014.11)

(58) Field of Classification Search
CPC ............................. H04N 19/127; H04N 19/14
See application file for complete search history.

(56) References Cited

U.S. PATENT DOCUMENTS

| | | | | |
|---|---|---|---|---|
| 5,719,632 A | * | 2/1998 | Hoang | H04N 19/177 375/E7.218 |
| 6,160,846 A | * | 12/2000 | Chiang | H04N 19/517 375/E7.14 |
| 6,688,714 B1 | * | 2/2004 | Bailleul | H04N 19/61 375/E7.184 |

(Continued)

OTHER PUBLICATIONS

European Patent Office, Communication, Extended European Search Report issued for European Patent Application No. 22305667.2, dated Oct. 11, 2022, 11 pages.

(Continued)

*Primary Examiner* — Zhihan Zhou
(74) *Attorney, Agent, or Firm* — Norton Rose Fulbright US LLP

(57) ABSTRACT

Disclosed herein are systems, devices, and methods for encoding a plurality of video channels in a shared resource environment. For a plurality of frames in the video channels, complexity metrics are computed, each estimating content complexity of a corresponding frame; and encoding budget metrics are computed, each defining an allocation of bits for encoding the corresponding frame. The encoding budget metrics of a particular video channel are computed to reduce anticipated encoding distortion in the particular video channel. A resource allocation is determined that allocates a portion of total resources of the shared resource environment for encoding each of the video channels. The resource allocation is determined to reduce anticipated encoding distortion across the video channels based on the encoding budgets and the complexity metrics. Encoding configurations are selected based on the resource allocation, each for encoding a corresponding video channel.

15 Claims, 7 Drawing Sheets

(56) References Cited

U.S. PATENT DOCUMENTS

| | | | |
|---|---|---|---|
| 9,100,509 B1* | 8/2015 | Jia | H04N 7/00 |
| 10,171,804 B1* | 1/2019 | Wang | H04N 19/127 |
| 10,506,266 B2 | 12/2019 | Yadav et al. | |
| 2006/0215760 A1* | 9/2006 | Monaco | H04N 19/149 |
| | | | 375/E7.157 |
| 2008/0181308 A1* | 7/2008 | Wang | H04N 19/156 |
| | | | 375/E7.125 |
| 2009/0073005 A1* | 3/2009 | Normile | H04N 19/103 |
| | | | 341/51 |
| 2010/0124274 A1* | 5/2010 | Cheok | H04N 19/70 |
| | | | 375/E7.125 |
| 2014/0119432 A1* | 5/2014 | Wang | H04N 19/177 |
| | | | 375/240.2 |
| 2014/0226724 A1* | 8/2014 | Sorin | H04N 19/19 |
| | | | 375/240.12 |
| 2014/0301460 A1* | 10/2014 | Karczewicz | H04N 19/18 |
| | | | 375/240.12 |
| 2017/0164018 A1* | 6/2017 | Yadav | H04N 7/06 |
| 2017/0201752 A1* | 7/2017 | Wang | H04N 19/426 |
| 2017/0208335 A1* | 7/2017 | Ramamurthy | H04N 19/156 |
| 2018/0220133 A1* | 8/2018 | Pattichis | H04N 19/127 |
| 2020/0128242 A1* | 4/2020 | Aristarkhov | H04N 19/14 |
| 2024/0205415 A1* | 6/2024 | Huang | H04N 19/146 |

OTHER PUBLICATIONS

Nunes et al. "Joint Bit-Allocation for Multi-Sequence H.264/AVC Video Coding Rate Control," Picture Coding Symposium, Lisboa, Portugal, Nov. 2007, 4 pages.

Huang et al. "Rate-Distortion-Complexity Optimized Coding Mode Decision for HEVC," IEEE Transactions on Circuits and Systems for Video Technology, vol. 30, No. 3, Mar. 2020, 15 pages.

Kannangara et al. "Computational Management of an H.264 Encoder," XP007902539, 25th Picture Coding Symposium, Beijing, China, 2006, 6 pages.

Lu et al. "Complexity-Aware Live Streaming System," IEEE International Conference on Image Processing, Sep. 2005, 4 pages.

* cited by examiner

SYSTEMS AND METHODS FOR MULTIPLE CHANNEL VIDEO ENCODING IN A SHARED RESOURCE ENVIRONMENT

CROSS-REFERENCE TO RELATED APPLICATIONS

This application is claiming priority to European Patent Application No. 22305667.2, titled "SYSTEMS AND METHODS FOR MULTIPLE CHANNEL VIDEO ENCODING IN A SHARED RESOURCE ENVIRONMENT," filed on May 4, 2022, the disclosure of which is incorporated herein by reference in its entirety.

FIELD

This disclosure relates to video data, and more particularly relates to processing multiple channels of video data in a shared resource environment.

BACKGROUND

Streaming of video content to end users over the Internet, such as via over-the-top media services, typically requires processing such video content to be suitable for streaming. For example, one or more video channels containing video content may need to be encoded for streaming. Encoding is resource intensive. The number of channels that can be processed on a given service platform (i.e., density) may have a significant impact on both capital and operating expenditures. Service platforms may make various trade-offs between density and video quality given available encoding resources, when allocating resources for encoding multiple video channels. Such trade-offs are often complex and may result, for example, degraded video quality, under-utilization of available resources, and/or other undesirable outcomes. Therefore, improvements in allocation of resources are desired.

SUMMARY

In accordance with an aspect, there is provided a computer-implemented method for encoding a plurality of video channels in a shared resource environment. The method includes: for a plurality of frames in the plurality of video channels: computing a plurality of complexity metrics, each estimating content complexity of a corresponding frame of the plurality of frames; computing a plurality of encoding budget metrics, each of the encoding budget metrics defining an allocation of bits for encoding the corresponding frame, wherein the encoding budget metrics corresponding to the frames of a particular video channel of the plurality of video channels are computed to reduce anticipated encoding distortion in the particular video channel based on the complexity metrics corresponding to the frames of the particular video channel. The method also includes determining a resource allocation that allocates a portion of total resources of the shared resource environment for encoding each of the video channels, wherein the resource allocation is determined to reduce anticipated encoding distortion across the video channels based on the encoding budgets and the complexity metrics; and selecting a plurality of encoding configurations based on the resource allocation, each of the encoding configurations for encoding a corresponding video channel of the plurality of video channels.

The determining the resource allocation may include allocating resources on a frame-by-frame basis.

The selecting the encoding configuration may include selecting on a frame-by-frame basis.

The complexity metrics may define a number of bits.

The encoding budget metrics may define a number of bits.

The resource allocation may define an allocated encoding time.

The determining the resource allocation may be further based on a minimum resource allocation.

The determining the resource allocation may be further based on a maximum resource allocation.

The method may further include receiving an indicator of the total resources of the shared resource environment.

The plurality of frames may correspond to a group of pictures in an encoded video stream.

The method may further include encoding the video channels using the selected encoding configurations.

The encoding may be constant bit rate encoding for each of the frames.

In accordance with another aspect, there is provided a computer-implemented system for encoding a plurality of video channels in a shared resource environment. The system includes: at least one processor; memory in communication with said at least one processor; software code stored in said memory. The software code when executed at said at least one processor causes the system to: for a plurality of frames in the plurality of video channels: compute a plurality of complexity metrics, each measuring content complexity of a corresponding frame of the plurality of frames; and compute a plurality of encoding budget metrics, each of the encoding budget metrics defining an allocation of bits for encoding the corresponding frame, wherein the encoding budget metrics corresponding to the frames of a particular video channel of the plurality of video channels are computed to reduce anticipated encoding distortion in the particular video channel based on the complexity metrics corresponding to the frames of the particular video channel. The software code when executed at said at least one processor also causes the system to determine a resource allocation that allocates a portion of total resources of the shared resource environment for encoding each of the video channels, wherein the resource allocation is determined to reduce anticipated encoding distortion across the video channels based on the encoding budgets and the complexity metrics; and select a plurality of encoding configurations based on the resource allocation, each of the encoding configurations for encoding a corresponding video channel of the plurality of video channels.

The resource allocation may be determined on a frame-by-frame basis.

The encoding configuration may be selected on a frame-by-frame basis.

Many further features and combinations thereof concerning embodiments described herein will appear to those skilled in the art following a reading of the instant disclosure.

BRIEF DESCRIPTION OF THE DRAWINGS

In the Figures.

These drawings depict exemplary embodiments for illustrative purposes, and variations, alternative configurations, alternative components and modifications may be made to these exemplary embodiments.

DETAILED DESCRIPTION

Figure 1:
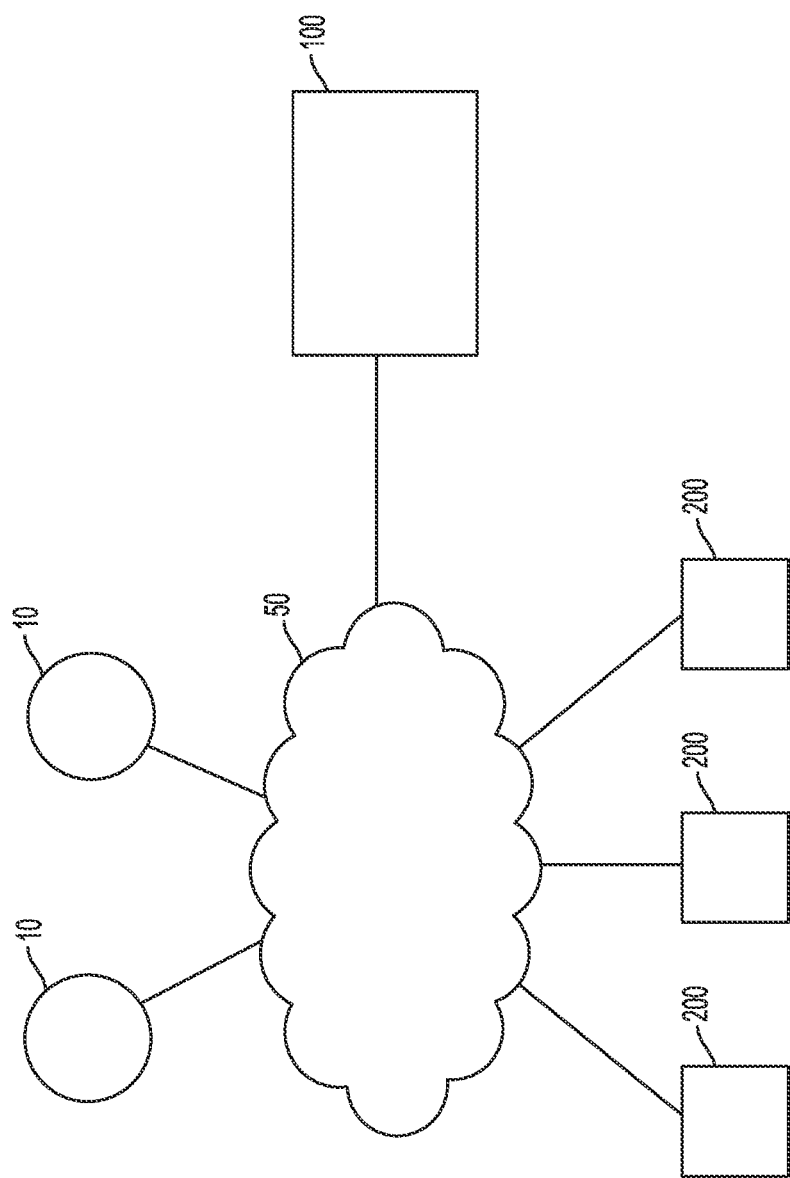
FIG. 1 is a network diagram of a network environment of an example over-the-top (OTT) media service including a content processing system, in accordance with an embodiment.
Figure 2:
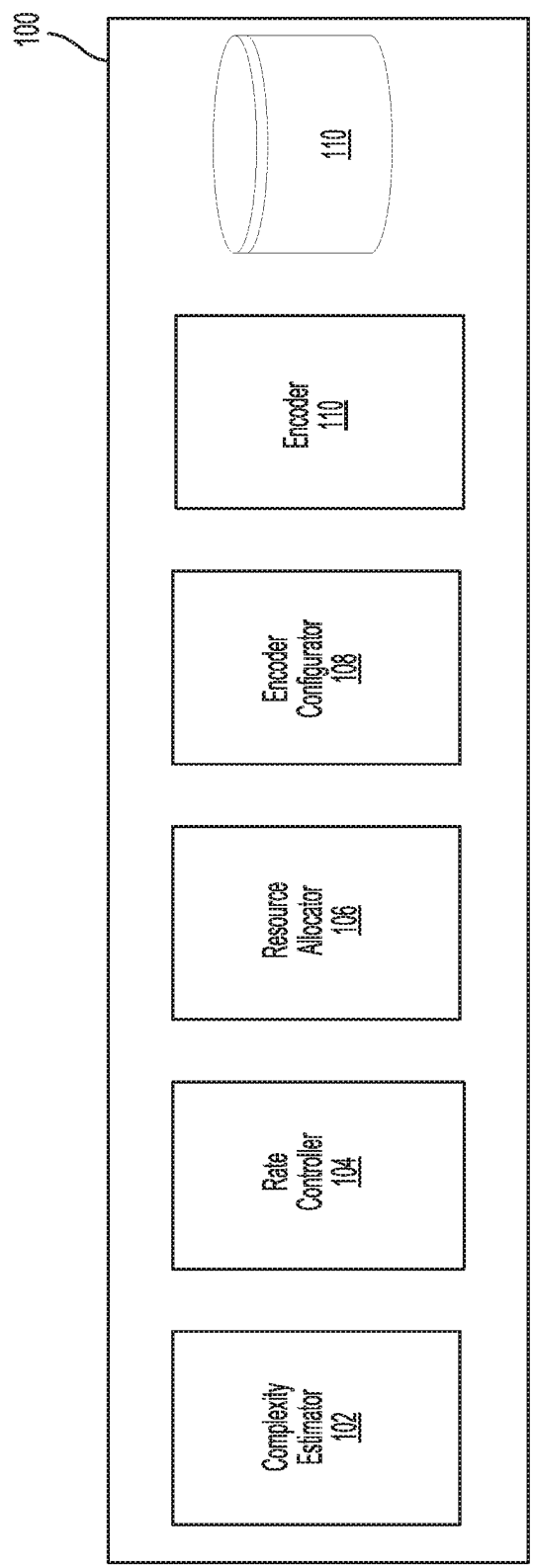
FIG. 2 is a schematic diagram of the content processing system of FIG. 1, in accordance with an embodiment.

FIG. 1 is a diagram depicting a network environment of an example over-the-top (OTT) media service for delivering video content to end users, in accordance with an embodiment. The OTT media service includes a content processing system 100 that processes video content in manners disclosed herein to facilitate streaming to end users.

As depicted, content processing system 100 is interconnected with a plurality of content sources 10 and a plurality of client devices 200, by way of a communication network 50. Content processing system 100 receives source content spanning a plurality of video channels from one or more of content sources 10 and processes such content to facilitate streaming to end users at client devices 200. Such processing includes, for example, encoding the content to be suitable for streaming to end users.

Content processing system 100 has finite available resources (e.g., encoding time given available processors, memory, etc.) which must be shared among the video channels to encode such video channels. Thus, content processing system 100 may be considered a shared resource environment. As detailed herein, in some embodiments, content processing system 100 allocates available resources across the video channels in manners that take into account resource consumption needs of video content of the video channels while increasing overall resource utilization. For example, in some embodiments, available resources are allocated to ensure that video quality across the video channels meet minimum quality standards and also that no more resources are allocated for particular video channels than are required to meet such minimum standards.

Embodiments of content processing system 100 may produce various technical effects and provide various technical advantages. For example, in some embodiments, encoding density (i.e., the number of video channels that can be encoded) at processing system 100 is increased, without a need to provide additional resources or unduly degrading video quality for end users. For example, in some embodiments, utilization rate at processing system 100 is increased, thereby reducing idle time and wasted resources.

Referring again to FIG. 1, in the depicted embodiment, each content source 10 may be a conventional source of video content (including audio-video content) such as, for example, a television station or an Internet live stream. For example, a content source 10 may receive linear content by way of a satellite signal, a radio frequency (RF) antenna signal, or a dedicated portion of network 50. Content may be received by content processing system 100 in various formats and bitrates, where it is processed for streaming to client devices 200.

Each client device 200 is a device operable by an end user to play streamed video content. For example, a client device 200 may be a digital media player, a set-top box, a video game console, each connected to a display device for playing streamed content. A client device 200 may also be smart TV device or a personal computing device such as a laptop computer, a tablet computer or a smartphone, each having an integrated display screen.

Network 50 may include a packet-switched network portion, a circuit-switched network portion, or a combination thereof. Network 50 may include wired links, wireless links such as radio-frequency links or satellite links, or a combination thereof. Network 50 may include wired access points and wireless access points. Portions of network 50 could be, for example, an IPv4, IPv6, X.25, IPX or similar network. Portions of network 50 could be, for example, a GSM, GPRS, 3G, LTE or similar wireless networks. Network 50 may include or be connected to the Internet. When network 50 is a public network such as the public Internet, it may be secured as a virtual private network.

In the depicted embodiment, portions of network 50 interconnecting content processing system 100 with client devices 200 are adapted for transmission of video streams (including audio-video streams) over HTTP. In other embodiments, other protocols may be used for transmission of video streams.

FIG. 1 is a high-level schematic of content processing system 100, in accordance with an embodiment.

As depicted, content processing system 100 includes a complexity estimator 102, a rate controller 104, a resource allocator 106, an encoder configurator 108, and an encoder 110.

Content processing system 100 is configured to process data of video content spanning a plurality video channels, where each video channel refers to a specific portion of the video content. Each video channel includes a plurality of frames (e.g., pictures) defining its portion of the video content.

In the description herein, a video channel of the plurality of video channels may be referred to as a channel i, where i is a numerical index that may have a value, for example, between 1 and I, where I is the total number of video channels. Further, a frame of the plurality of frames of a particular video channel may be referred to as a frame t, where t is a numerical index that may have a value, for example, between 1 and $T_i$, where $T_i$ is the total number of frames in the particular video channel i.

In processing the plurality of video channels, content processing system 100 uses resources shared for the video channels. Content processing system 100 allocates the shared resources across the video channels taking into account the resource consumption requirement of each of the video channels. The resource consumption requirement of a video channel depends at least in part on the content complexity of the frames defining the video content of that video channel. As used herein, complexity refers to an encoding cost of a particular frame in bits, i.e., the number of bits required to encode that frame.

Complexity estimator 102 analyzes the frames of each of the video channels to estimate content complexity on a frame-by-frame basis. In particular, complexity estimator 102 computes a plurality of complexity metrics $\alpha_{i,t}$, each estimating content complexity of a particular frame t of a particular video channel i. The set of frames of a video channel i may correspond, for example, to a group of pictures (GOP).

Complexity estimator 102 computes a complexity metric $\alpha_{it}$ by estimating the spatial and/or temporal complexity of a particular frame t of video channel i. In some embodiments, computing a complexity metric $\alpha_{it}$ takes into account the type of encoder expected to be used (e.g., Versatile Video Codec (VVC), H.265/High Efficiency Video Coding (HEVC), H.264/Advanced Video Coding (AVC), MPEG-2, or the like). In some embodiments, computing a complexity metric $\alpha_{it}$ includes estimating the motion vectors in the frame t. In some embodiments, computing a complexity metric $\alpha_{it}$ includes predicting the type of frame t, e.g., whether the frame t is an inter-coded frame, an intra-coded frame, or the like.

In one specific embodiment, complexity estimator 102 computes a complexity metric $\alpha_{it}$ in accordance with the computations described in U.S. Patent Publication 2014/0226724, entitled "System and Method for the Dynamic Reduction of the Entropy of a Signal Upstream to a Data Compression Device", the contents of which are hereby incorporated by reference.

Because complexity estimator 102 is configured to analyze complexity of frames ahead of when they need to be encoded, it may also be referred to as a "look ahead."

Figure 3:
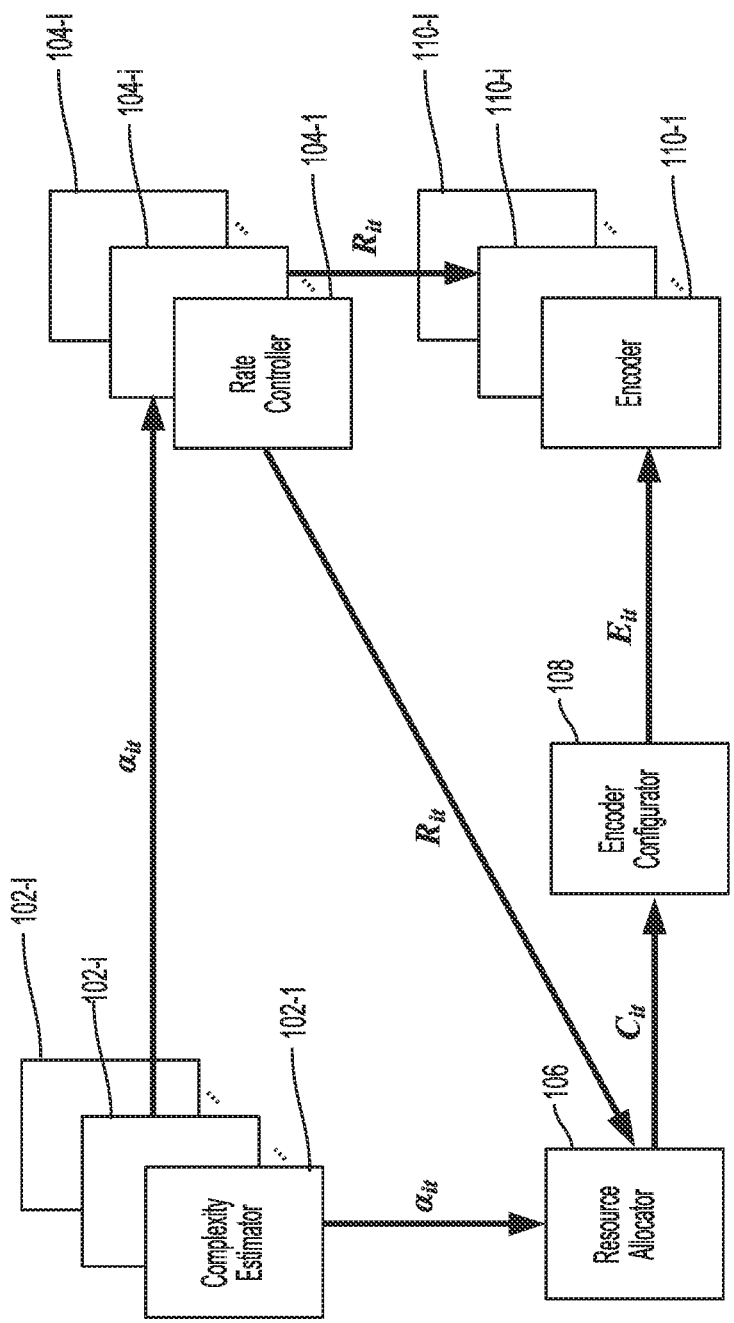
FIG. 3 is an entity and data flow diagram of the content processing system of FIG. 1, in accordance with an embodiment.

FIG. 3 is an entity and dataflow diagram for content processing system 100, in accordance with an embodiment. As depicted, complexity estimator 102 is configured to be instantiated in multiple instances, and each instance may be referred to as complexity estimator 102-1 . . . 102-i, and so on. In the depicted embodiment, each instance of complexity estimator 102 is dedicated to a corresponding video channel and computes the complexity metrics for that video channel. So, for example, the instance of complexity estimator 102-i computes the complexity metrics for the corresponding video channel i. The total number of instances of complexity estimator 102 may be equal to the total number of video channels. During operation, two or more instances of complexity estimator 102 may operate in parallel.

Rate controller 104 controls a budget in bits (e.g., a bitrate) allocated for encoding the video channels by computing encoding budgets on a frame-by-frame basis. Rate controller 104 receives the complexity metrics $\alpha_{it}$ from complexity estimator 102 and computes a plurality of encoding budgets $R_{it}$. Each of the encoding budgets $R_{it}$ defines an allocation of bits for encoding a particular frame t of a particular video channel i, computed based on the complexity metric $\alpha_{it}$ for that particular frame t of that particular video channel i.

Rate controller 104 computes the encoding budgets $R_{it}$ to reduce anticipated encoding distortion, i.e., anticipated errors or differences between the original video contents and the final video contents, e.g., after encoding at content processing system 100. In some embodiments, anticipated encoding distortion may be modeled and predicted as a mean-square-error of differences in pixel values between the original video contents and the final video contents after encoding. In some embodiments, anticipated encoding distortion may be modeled and predicted using a Structural Similarity Index (SSIM) or other perception-based metrics. In one specific embodiment, anticipated encoding distortion may be modeled and predicted in accordance with the models and calculations described in U.S. Patent Publication 20210160544, entitled "Systems and methods for measuring visual quality degradation in digital content", the contents of which are hereby incorporated by reference.

The encoding budgets $R_{it}$ are computed with the following constraints:

$$\begin{cases} \min\left(\sum_t D_{it}\right) \\ \text{s.t.} \sum_t R_{it} = R_i \end{cases}$$

where $D_{it}$ is the anticipated distortion caused by encoding of particular frame t of a particular video channel i, and $R_i$, is a total budget in bits allocated to encode the plurality of frames of a video channel i. The value of $R_i$, may be pre-determined, e.g., based on available resources (e.g., bandwidth) of content processing system 100 or and/or end user preferences. The value of $R_i$, may be pre-determined based on one or more characteristics of the video content of the particular video channel i. For example, the value of $R_i$, may be pre-determined based on a desired overall bitrate for the video channel i. The desired bitrate may be based on, for example, the pixel resolution of the video content. The value of $R_i$ may be pre-determined based on, for example, the type of content; for example, a higher budget may be desirable for sports content and a lower budget may be desirable for news content. Of note, the total distortion $\Sigma_t D_{it}$ of a plurality of frames of a particular video channel i is minimized, wherein the plurality of frames may belong, for example, to a given GOP.

Given the complexities metrics $\alpha_{it}$, the encoding budget for each frame is computed as:

$$R_{it} = R_i \frac{\alpha_{it}^r}{\sum_t \alpha_{it}^r}$$

where r is a pre-defined constant. In the depicted embodiment, r may be defined to have a value of ⅓. In other embodiments, the value of r may vary, for example, between 0 and. The value of r may be selected, for example, based on a particular distortion model used at content processing system 100. For example, the above example value of r is selected for an MSE distortion model. In another embodiment, r may be defined to have a value of 0.5, for example.

Referring again to FIG. 3, similar to complexity estimator 102, rate controller 104 is configured to be instantiated in multiple instances, and each instance may be referred to as rate controller 104-1 . . . 104-i, and so on. In the depicted embodiment, each instance of rate controller 104 is dedicated to a corresponding video channel, and cooperates with a corresponding instance of complexity estimator 102 to compute the encoding budget for that video channel. So, for example, the instance of complexity estimator 104-i receives complexity metrics $\alpha_{it}$ for each frame of corresponding channel i from complexity estimator 102-i, and computes the encoding budget for each frame of the corresponding video channel i. The total number of instances of rate controller 104 may be equal to the total number of video channels. During operation, two or more instances of rate controller 104 may operate in parallel.

Resource allocator 106 determines a resource allocation that allocates a portion of total resources of the shared resource environment for encoding video content in the video channels. The resource allocation defines a quantity of a resource that will be consumed to encode the video content, which may be, for example, an encoding time. In other embodiments, resource allocator 106 may be configured to allocate other types of resources necessary for processing video data (e.g., volatile memory, non-volatile memory, cache, bandwidth, electrical power, monetary resources, etc.).

Referring again to FIG. 3, resource allocator 106 receives the complexities metrics $\alpha_{it}$ from each of the instances of complexity estimator 102 and receives encoding budgets $R_{it}$ from each of the instances of rate controller 104.

Based on the received complexities metrics $\alpha_{it}$ and encoding budgets $R_{it}$, resource allocator 106 determines a resource allocation. In the depicted embodiment, the resource allocation is determined on a frame-by-frame basis, i.e., the resource allocation includes a plurality of per-frame resource allocations, $C_{it}$, each defining resources available to be consumed for a particular frame t in a particular video channel i.

The per-frame resource allocations $C_{it}$ are computed with the following constraints:

$$\begin{cases} \min\left(\sum_i D_{it}\right) \\ \text{s.t.} \sum_t R_{it} = R_i \\ \text{and} \sum_i C_{it} = C \\ C_{min} \leq C_{it} \leq C_{max} \end{cases}$$

where C is a resource capacity (e.g., total resources allocable) for encoding at content processing system 100, and $C_{min}$ and $C_{max}$ are minimum and maximum resources allocable for a frame, respectively. The values of $C_{min}$ and $C_{max}$ may be pre-defined.

The anticipated encoding distortion $D_{it}$ is computed in manners similar to that described for rate controller 104. In contrast to the distortion minimization performed by rate controller 104, the distortion minimization performed by resource allocator 106 is such that distortion is also minimized across the video channels (e.g., with a summation over i).

Given the complexity metrics $\alpha_{it}$ and the encoding budgets $R_{it}$, the per-frame resource allocation defined as:

$$C_{it} = C \frac{\alpha_{it}^p R_{it}^{-q}}{\sum_i \alpha_{it}^p R_{it}^{-q}}$$

where p and q are two constants. In the depicted embodiment, p may be defined to have a value of 0.5 and q may be defined to have a value of 1. In other embodiments, the value of p may vary, for example, between 0 and 2, and the value of q may vary, for example, between 0 and 2. The values of p and q may be selected, for example, based on a particular distortion model used at content processing system 100. For example, the above example values of p and q are selected for an MSE distortion model.

In some embodiments, the determination of complexity metrics $\alpha_{it}$ may utilize inequality constraints. In one particular embodiment, the utilization of inequality constraints may adapt methodologies described in M. Blestel, M. Ropert and W. Hamidouche, "Generic statistical multiplexer with a parametrized bitrate allocation criterion," 2016 IEEE International Conference on Image Processing (ICIP), Phoenix, AZ, 2016, pp. 2127-2131.

Encoding configurator 108 determines encoding configurations for encoding video content in the video channels. An encoding configuration includes a selection of various encoding variables, parameters, algorithms, features, or the like, that are used by encoder 110 to encode video content. In the depicted embodiment, encoding configurator 108 determines encoding configurations on a frame-by-frame basis to provide a plurality of per-frame configurations $E_{it}$, each for encoding a particular frame tin a particular video channel i. Each $E_{it}$ is selected based on a per-frame resource allocation $C_{it}$.

Referring again to FIG. 3, encoding configurator 108 receives the resource allocations $C_{it}$ from resource allocator 106. Encoding configurator 108 applies a mapping function f that maps a particular value of a resource allocation $C_{it}$ to an encoding configuration $E_{it}$ that will consume the resource allocated for a particular frame t of a particular video channel i. The mapping function f, may be expressed, for example, as $E_{it}=f(C_{it})$. In some embodiments, the mapping function may be defined using empirical data. In some embodiments, the mapping function may be defined using a suitable mathematical model.

Figure 4:
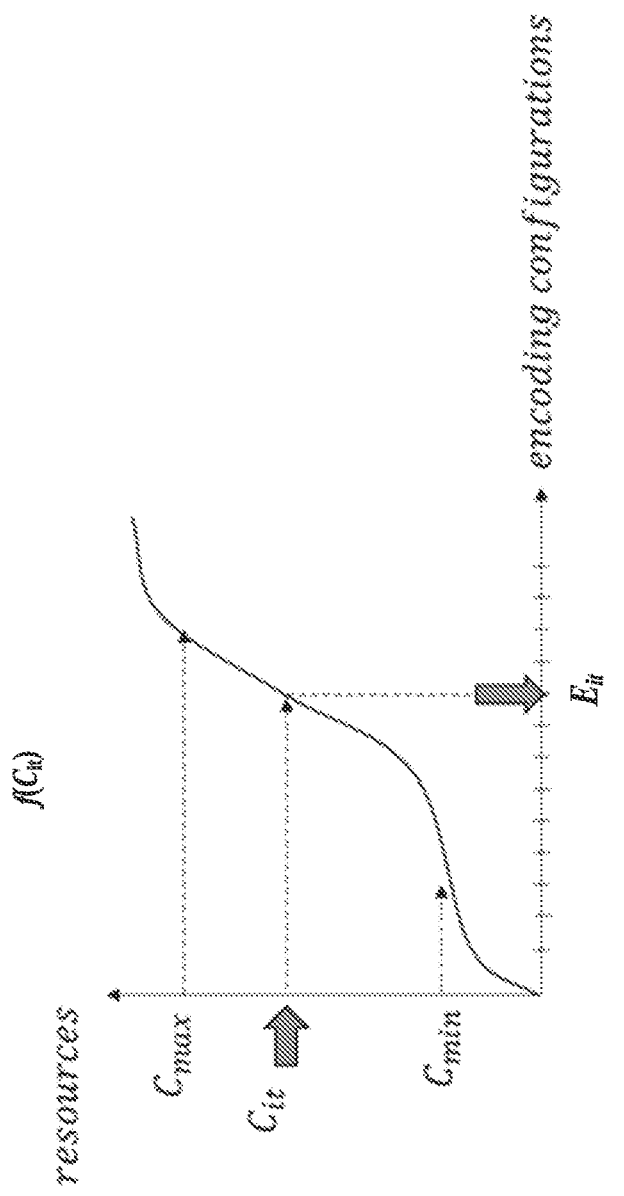
FIG. 4 is a graph of a function for mapping resource allocations to encoding configurations, in accordance with an embodiment.

FIG. 4 depicts an example mapping f, in accordance with an embodiment. As depicted, $C_{min}$ is mapped to a minimal encoding configuration that ensures a minimum video quality for a video channel after encoding. The minimum video quality (and hence the corresponding minimal encoding configuration) may be set, for example, according to a particular platform, a particular product, a particular type of client device 200, or the like.

As depicted, $C_{max}$ is mapped to a maximal encoding configuration to limit resource consumption. The maximal encoding configuration may be set based on, for example, total resources of a particular shared resource environment, and the total number of video channels to be encoded using the environment's shared resources.

Various encoding configurations (e.g., a minimal configuration, a maximal configuration, one or more intermediate configurations) may be defined based on encoders available at content processing system 100 (e.g., available at encoder 110).

Figure 5:
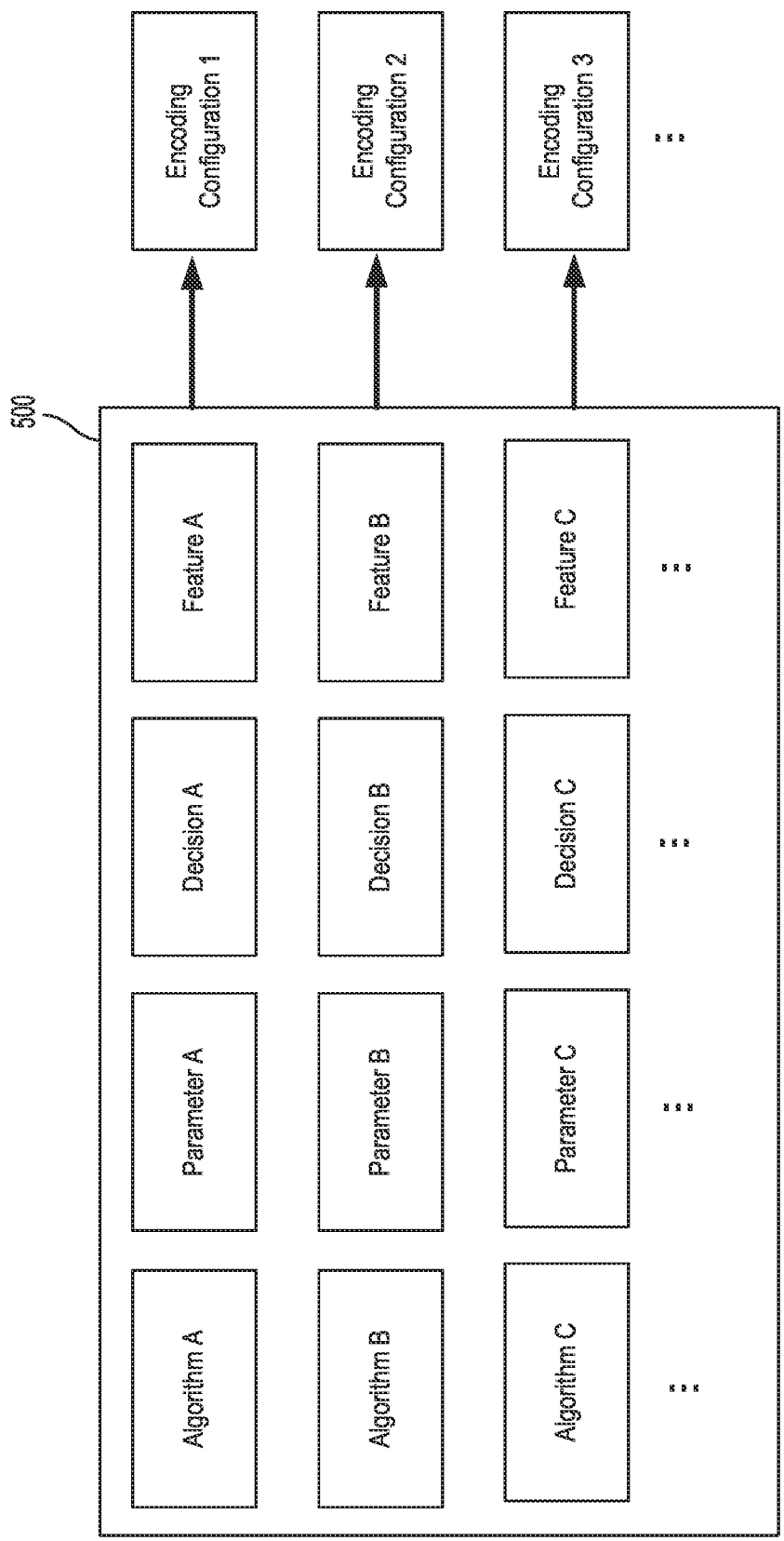
FIG. 5 is a schematic diagram of various encoding variables and options for defining an encoding configuration, in accordance with an embodiment.

FIG. 5 shows schematically various encoding variables and options that may be set to define an encoding configuration $E_{it}$, in accordance with an embodiment. For example, these variations and options may include:

(A) various algorithms implemented by an encoder (e.g., algorithms for motion estimation to predict motion vectors between two frames);

(B) various parameters of an encoder (e.g., the number of frames of a particular type such as a B frame);

(C) various decisions to be made by an encoder (e.g., a decision based on SAD (sum absolute of difference), or RDO (rate distortion optimization))

(D) when the encoder utilizes a neural network such as a deep learning network for feature extraction, various features that can be extracted (e.g., spatial activity, gradients, motion vectors, or the like).

Given a set of possible encoding configurations, encoding configurator 108 selects an appropriate encoding configuration $E_{it}$ on a frame-by-frame basis, i.e., each for encoding a particular frame t of a particular video channel i.

Encoder 110 encodes video content of the video channels. Encoder 110 may implement one or more conventional encoding algorithms. For example, encoder 110 may implement one or more of VVC, H.265/HEVC, H.264/AVC, MPEG-2 encoding, or the like. In the depicted embodiment, encoder 110 implements a constant bit rate (CBR) encoding algorithm, e.g., capable of encoding a frame at a prescribed bitrate defined in an encoding budget $R_{it}$.

Referring again to FIG. 3, encoder 110 is configured to be instantiated in multiple instances, and each instance may be referred to as encoder 110-1, . . . 110-i, and so on. In the depicted embodiment, each instance of encoder 110 is dedicated to encoding video content of a corresponding video channel. So, for example, the instance of encoder 110-i receives encoding configurations $E_{it}$ for corresponding channel i from encoding configurator 108 and receives encoding budgets $R_{it}$ for corresponding channel i from an instance of rate controller 104-i. Based on the received encoding configurations $E_{it}$ and encoding budgets $R_{it}$ encoder 110-i encodes the frames of video channel i. The total number of instances of encoder 110 may be equal to the total number of video channels. During operation, two or more instances of encoder 110 may operate in parallel.

Content processing system 100 is configured to transmit video content encoded by encoder 110 to one or more client devices 200.

In some embodiments, content processing system 100 does not include encoder 110. In such embodiments, control processing system 100 may provide one or more encoding configurations to another system that performs encoding.

Each of complexity estimator 102, rate controller 104, resource allocator 106, encoder configurator 108, and encoder 110 may be implemented using conventional programming languages such as Java, J#, C, C++, C#, Perl, Visual Basic, Ruby, Scala, etc. These components of system 100 may be in the form of one or more executable programs, scripts, routines, statically/dynamically linkable libraries, or the like.

Electronic data store 114 may include a combination of non-volatile and volatile memory. In some embodiments, electronic data store 114 stores a plurality of pre-defined encoding configurations for selection for encoder configurator 108.

The operation of content processing system 100 is further described with reference to the flowchart depicted in FIG. 6. Content processing system 100 performs the example operations depicted at blocks 600 and onward, in accordance with an embodiment.

Operation begins when content processing system 100 receives video content for a plurality of video channels, for encoding.

At block 602, complexity estimator 102 computes a plurality of complexity metrics $\alpha_{it}$, each estimating content complexity of a corresponding frame t of a corresponding video channel i. Instances of complexity estimator 102 may be instantiated as required, e.g., to provide an instance dedicated to each video channel i.

At block 604, rate controller 104 computes a plurality of encoding budget metrics $R_{it}$, each defining an allocation of bits for encoding the corresponding frame t of a corresponding video channel i. Each of the encoding budget metrics corresponding to the frames of a particular video channel i are computed to reduce anticipated encoding distortion in the particular video channel i based on the complexity metrics $\alpha_{it}$ corresponding to the frames of the particular video channel i. In some embodiments, rate controller 104 may receive an indicator of each $R_i$ (total budget in bits allocated to encode the plurality of frames of a video channel i).

Instances of rate controller 104 may be instantiated as required, e.g., to provide an instance dedicated to each video channel i.

At block 606, resource allocator 106 determines a resource allocation that allocates a portion of total resources of the shared resource environment for encoding each of the video channels. The resource allocation is determined to reduce anticipated encoding distortion across the video channels based on the encoding budgets $R_{it}$ and the complexity metrics $\alpha_{it}$. The resource allocation may performed on a frame-by-frame basis, and thus include a plurality of per-frame resource allocations, $C_{it}$, each defining resources available to be consumed for encoding a particular frame tin a particular video channel i. In some embodiments, encoding configurator 108 receives an indicator of $C_{min}$ (minimum resources allocable for a frame) for determining resource allocations. In some embodiments, encoding configurator 108 receives an indicator of $C_{max}$ (maximum resources allocable for a frame) for determining resource allocations. In some embodiments, encoding configurator 108 receives an indicator of C (i.e., capacity or total resources allocable) for determining resource allocations.

At block 608, encoding configurator 108 selects an encoding configuration for each of the video channels based on the resource allocation determined by resource allocator 106. The selection of encoding configurations may be performed on a frame-by-frame basis, and thus include a plurality of per-frame encoding configurations $E_{it}$.

Optionally, encoder 110 may encode the video content of the video channels using the encoding configurations.

Instances of encoder 110 may be instantiated as required, e.g., to provide an instance dedicated to each video channel i.

Figure 6:
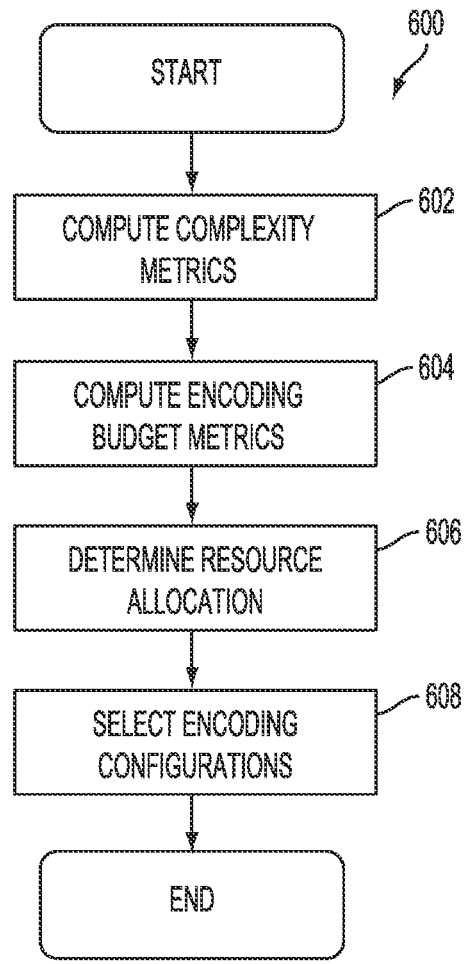
FIG. 6 is a flowchart of example operations performed at the content processing system of FIG. 1, in accordance with an embodiment.

It should be understood that steps of one or more of the blocks depicted in FIG. 6 may be performed in a different sequence or in an interleaved or iterative manner. Further, variations of the steps, omission or substitution of various steps, or additional steps may be considered.

In some embodiments, the blocks depicted in FIG. 6 may be performed for each of the frames in each of the video channels. In some embodiments, these blocks may be performed for a subset of the frames. In one example, the blocks are performed for subset of frames spanning a particular time period. In another example, some blocks (e.g., blocks 602 and/or blocks 604) are only performed for certain frames (e.g., every second frame, every tenth frame, or the like) based on an assumption that the content complexity and hence the encoding budget is unlikely to change significantly within such a range.

Figure 7:
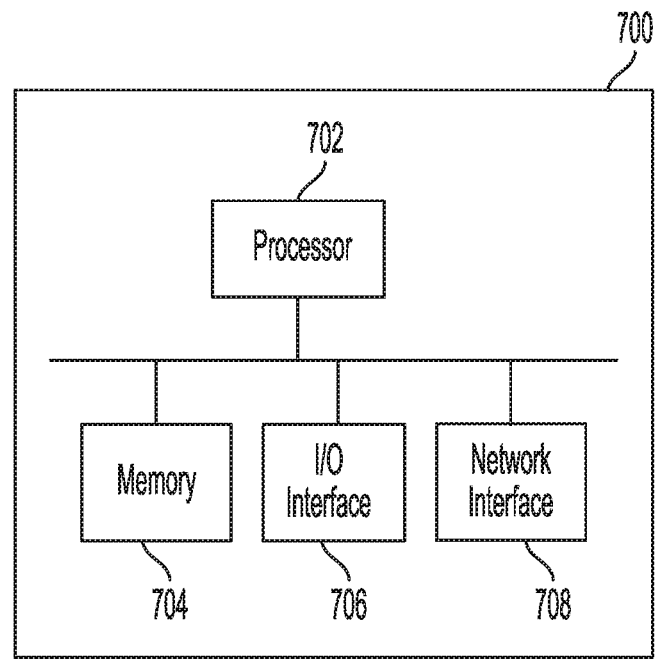
FIG. 7 is a schematic diagram for a computing device, in accordance with an embodiment.

FIG. 7 is a schematic diagram of computing device 700 which may be used to implement content processing system 100, in accordance with an embodiment.

As depicted, computing device 700 includes at least one processor 702, memory 704, at least one I/O interface 706, and at least one network interface 708.

Each processor 702 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 706 enables computing device 700 to interconnect with one or more input devices, such as a keyboard, mouse, camera, touch screen and a microphone, or with one or more output devices such as a display screen and a speaker.

Each network interface 708 enables computing device 700 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 700 is shown but system 100 may include multiple computing devices 700. The computing devices 700 may be the same or different types of devices. The computing devices 700 may be connected in various ways including directly coupled, indirectly coupled via a network, and distributed over a wide geographic area and connected via a network (which may be referred to as "cloud computing").

In such a cloud environment, as capacity may vary dynamically, the quantity of processes or memory (or other resources) may be pre-defined to provide a measure of allocable resources such as C.

For example, a computing device 700 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

In some embodiments, a computing device 700 may function as a client device 200.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which may be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for encoding a plurality of video channels in a shared resource environment, the method comprising:
   for a plurality of frames in the plurality of video channels:
      computing a plurality of complexity metrics, each estimating content complexity of a corresponding frame of the plurality of frames;
      computing a plurality of encoding budget metrics, each of the encoding budget metrics defining an allocation of bits for encoding the corresponding frame, wherein the encoding budget metrics corresponding to the frames of a particular video channel of the plurality of video channels are computed to reduce anticipated encoding distortion predicted to exist after encoding the particular video channel, wherein the encoding budget metrics are computed based on the complexity metrics corresponding to the frames of the particular video channel, and wherein the anticipated encoding distortion comprises anticipated errors or differences predicted to exist between the frames of the particular video channel and the frames of the particular video channel after being encoded;
   determining a resource allocation that allocates a portion of total resources of the shared resource environment for encoding each of the video channels, wherein the resource allocation is determined to reduce the anticipated encoding distortion across the video channels based on the encoding budgets and the complexity metrics; and
   selecting a plurality of encoding configurations based on the resource allocation, each of the encoding configurations comprising a selection of a plurality of encoding variables for encoding a corresponding video channel of the plurality of video channels.

2. The computer-implemented method of claim 1, wherein said determining the resource allocation includes allocating resources on a frame-by-frame basis.

3. The computer-implemented method of claim 1, wherein said selecting the encoding configuration includes selecting on a frame-by-frame basis.

4. The computer-implemented method of claim 1, wherein the complexity metrics define a number of bits.

5. The computer-implemented method of claim 1, wherein the encoding budget metrics define a number of bits.

6. The computer-implemented method of claim 1, wherein the resource allocation defines an allocated encoding time.

7. The computer-implemented method of claim 1, wherein said determining the resource allocation is further based on a minimum resource allocation.

8. The computer-implemented method of claim 1, wherein said determining the resource allocation is further based on a maximum resource allocation.

9. The computer-implemented method of claim 1, further comprising:
  receiving an indicator of the total resources of the shared resource environment.

10. The computer-implemented method of claim 1, wherein the plurality of frames correspond to a group of pictures in an encoded video stream.

11. The computer-implemented method of claim 1, further comprising:
  encoding the video channels using the selected encoding configurations and the encoding budget metrics.

12. The computer-implemented method of claim 11, wherein said encoding is constant bit rate encoding for each of the frames.

13. A computer-implemented system for encoding a plurality of video channels in a shared resource environment, the system comprising:
  at least one processor;
  memory in communication with said at least one processor;
  software code stored in said memory, which when executed at said at least one processor causes the system to:
  for a plurality of frames in the plurality of video channels:
    compute a plurality of complexity metrics, each measuring content complexity of a corresponding frame of the plurality of frames;
    compute a plurality of encoding budget metrics, each of the encoding budget metrics defining an allocation of bits for encoding the corresponding frame, wherein the encoding budget metrics corresponding to the frames of a particular video channel of the plurality of video channels are computed to reduce anticipated encoding distortion predicted to exist after encoding the particular video channel, wherein the encoding budget metrics are computed based on the complexity metrics corresponding to the frames of the particular video channel, and wherein the anticipated encoding distortion comprises anticipated errors or differences predicted to exist between the frames of the particular video channel and the frames of the particular video channel after being encoded;
  determine a resource allocation that allocates a portion of total resources of the shared resource environment for encoding each of the video channels, wherein the resource allocation is determined to reduce the anticipated encoding distortion across the video channels based on the encoding budgets and the complexity metrics; and
  select a plurality of encoding configurations based on the resource allocation, each of the encoding configurations comprising a selection of a plurality of encoding variables for encoding a corresponding video channel of the plurality of video channels.

14. The computer-implemented system of claim 13, wherein the resource allocation is determined on a frame-by-frame basis.

15. The computer-implemented system of claim 13, wherein the encoding configuration is selected on a frame-by-frame basis.

* * * * *

UNITED STATES PATENT AND TRADEMARK OFFICE
CERTIFICATE OF CORRECTION

PATENT NO. : 12,389,002 B2
APPLICATION NO. : 18/306772
DATED : August 12, 2025
INVENTOR(S) : Jean Kypreos et al.

Page 1 of 1

It is certified that error appears in the above-identified patent and that said Letters Patent is hereby corrected as shown below:

In the Specification

At Column 8, Line number 6, delete "frame tin" and replace with --frame $t$ in--.
At Column 10, Line number 7, delete "frame tin" and replace with --frame $t$ in--.

Signed and Sealed this
Twenty-third Day of September, 2025

John A. Squires
*Director of the United States Patent and Trademark Office*